(12) United States Patent
Dhandapani et al.

(10) Patent No.: US 9,201,833 B2
(45) Date of Patent: *Dec. 1, 2015

(54) BACKPLANE CONTROLLER CAPABLE OF TRANSFERRING AND RECEIVING DATA THROUGH USB INTERFACE

(71) Applicant: AMERICAN MEGATRENDS, INC., Norcross, GA (US)

(72) Inventors: Kayalvizhi Dhandapani, Suwanee, GA (US); Clas Sivertsen, Lilburn, GA (US); Jay Pancholi, Duluth, GA (US); Shibu Abraham, Duluth, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 53 days.

This patent is subject to a terminal disclaimer.

(21) Appl. No.: 14/190,474

(22) Filed: Feb. 26, 2014

(65) Prior Publication Data

US 2015/0242355 A1 Aug. 27, 2015

(51) Int. Cl.
*G06F 3/00* (2006.01)
*H05K 7/10* (2006.01)
*G06F 13/40* (2006.01)
*G06F 13/38* (2006.01)

(52) U.S. Cl.
CPC .......... *G06F 13/4072* (2013.01); *G06F 13/385* (2013.01)

(58) Field of Classification Search
CPC ...... G06F 1/184; G06F 1/186; G06F 11/3031
USPC ........................................... 710/13, 301, 302
See application file for complete search history.

(56) References Cited

U.S. PATENT DOCUMENTS

| 6,073,205 | A | 6/2000 | Thomson | |
|---|---|---|---|---|
| 8,069,257 | B1 * | 11/2011 | Bhatia et al. | 709/230 |
| 2003/0065841 | A1 * | 4/2003 | Pecone | 710/105 |
| 2005/0240708 | A1 * | 10/2005 | Shaver et al. | 710/313 |
| 2008/0168192 | A1 * | 7/2008 | Park | 710/27 |
| 2011/0022783 | A1 | 1/2011 | Moshayedi | |
| 2011/0302352 | A1 * | 12/2011 | Lee et al. | 711/102 |
| 2013/0282934 | A1 | 10/2013 | England et al. | |
| 2014/0330992 | A1 * | 11/2014 | Li | 710/33 |

* cited by examiner

*Primary Examiner* — Idriss N Alrobaye
*Assistant Examiner* — Getente A Yimer
(74) *Attorney, Agent, or Firm* — Locke Lord LLP; Tim Tingkang Xia, Esq.

(57) ABSTRACT

Present disclosure relates to backplane controller configured as human interface device (HID) device to communicate with host computer through USB interface. Backplane controller includes: processor, memory, HID universal serial bus (USB) interface, and non-volatile memory. Non-volatile memory stores certain USB descriptors, drive management module, USB HID device driver, and firmware of the backplane controller. Firmware performs one or more of following operations: (a) connecting to host computer through USB interface, (b) sending USB descriptors to host computer to act as specific HID device, (c) instructing USB HID device driver of backplane controller to generate first USB HID report, (d) sending USB HID report to host computer through USB interface, (e) receiving second USB HID report from host computer through USB interface, (f) instructing USB HID device driver to retrieve and process report data from second USB HID report. USB interface includes HID USB interface, USB interface bus, host USB interface.

25 Claims, 6 Drawing Sheets

BACKPLANE CONTROLLER CAPABLE OF TRANSFERRING AND RECEIVING DATA THROUGH USB INTERFACE

CROSS-REFERENCE TO RELATED APPLICATIONS

This application is related to copending U.S. patent application Ser. No. 14/190,937, filed Feb. 26, 2014, entitled "MONITORING AND MANAGING STORAGE DRIVES AND PERFORMING BACKPLANE CONTROLLER FIRMWARE UPDATE USING A USB INTERFACE," which is incorporated herein by reference in its entirety. The above-identified copending application has the same assignee as this application.

FIELD

The present disclosure relates generally to data transfer between a host computer and a backplane controller, and particularly to data transfer between a host computer and a backplane controller using the universal serial bus (USB) interface.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In a data center with large amount of storage space, a backplane is used to mount a number of storage drives, such as Disk Arrays, redundant array of independent disks (RAID) Subsystems, Small Computer System Interface (SCSI) and Fiber Channel (FC) Disk Array, and Switched Disk Array Servers. The storage drives are usually mounted on a backplane with a backplane controller installed. A backplane is a circuit board with connectors and power circuitry into which storage drives are attached. They can have multiple slots, each of which can be populated with a storage drive. Typically the backplane is equipped with LEDs which by their color and activity indicate the status of the storage drives connected to the backplane. Typically, a storage drive's LED will emit a particular color or blink pattern to indicate its current status such as a storage drive is attached to the backplane, working, accessing data, or in fail state.

Backplane controller is a device that can receive drive status and drive activities information through serial general purpose input/output (SGPIO), SCSI Enclosure Services (SES) or other proprietary protocols from a host bus adaptor (HBA). On the other hand, the monitoring and management of these storage drives can also be carried out by using a baseboard management controller (BMC) to monitor the status and activities of the storage drives. However, there is no direct connection between the host computer and the backplane controller. It is desirable to have a direct communication channel between the host computer and the backplane controller using a protocol that is widely accepted in the art.

Therefore, an unaddressed need exists in the art to address the aforementioned deficiencies and inadequacies.

SUMMARY

In one aspect, the present disclosure relates to a system, which includes a backplane controller. In certain embodiments, the backplane controller includes: (a) a processor, (b) a non-volatile memory, and (c) a universal serial bus (USB) interface. The non-volatile memory stores firmware, a plurality of USB descriptors, and a USB human interface device (HID) device driver. When the firmware is executed at the processor, the firmware is configured to: when the backplane controller is connected to a host computer via the USB interface, send the plurality of USB descriptors to the host computer through the USB interface such that the host computer recognizes the backplane controller as a specific HID device based on the plurality of USB descriptors; instruct the USB HID device driver to generate a first USB HID report in a predefined format based on the USB descriptors, wherein the predefined format comprises a USB header, report data, and a USB footer; generate a first backplane drive management message as the report data of the first USB HID report by the drive management module; send the first USB HID report generated by the USB HID device driver to the host computer through the USB interface; receive a second USB HID report in the predefined format from the host computer through the USB interface; instruct the USB HID device driver to retrieve the report data from the second USB HID report, wherein the retrieved report data is a second backplane drive management message; and process the second backplane drive management message.

In certain embodiments, the USB header includes a synchronization field and a packet identifier field, and the USB footer comprises a cyclic redundancy checking (CRC) field and an end of packet (EOP) field.

In certain embodiments, each of the first USB HID report and the second USB HID report comprises at least one USB data packet.

In certain embodiments, the firmware is configured to send the plurality of USB descriptors to the host computer through the USB interface by: receiving a request for one of the USB descriptors from the host computer through the USB interface; and sending, in response to the request, the requested USB descriptor to the host computer through the USB interface.

In certain embodiments, the firmware is configured to receive the second USB HID report from the host computer through the USB interface by: receiving at least one USB data packet of the second USB HID report from the host computer through the USB interface; and instructing the USB HID device driver to combine the at least one USB data packet to generate the second USB HID report.

In certain embodiments, the firmware is configured to send the first USB HID report to the host computer through the USB interface by instructing the USB HID device driver to: generate at least one USB data packet from the first USB HID report; and send the at least one USB data packet of the first USB HID report to the host computer through the USB interface.

In certain embodiments, the host computer includes: a host processor configured to control operation of the host computer; and a storage device configured to store a drive management application, an operating system (OS), and a USB HID host driver. The drive management application, when executed at the host processor, is configured to: receive and process the first backplane drive management message received from the OS; generate the second backplane drive management message as the report data of the second USB HID report; and send the second backplane drive management message to the OS. The OS, when executed at the host processor, is configured to: when the backplane controller is connected to the host computer via the USB interface, receive the plurality of USB descriptors from the backplane controller through the USB interface, and recognize the backplane controller as the specific HID device to receive the second USB HID report based on the plurality of USB descriptors; receive the second backplane drive management message from the drive management application; instruct the USB HID host driver to generate the second USB HID report from the second backplane drive management message in the predefined format based on the plurality of USB descriptors; send the second USB HID report generated by the USB HID host driver to the backplane controller through the USB interface; receive the first USB HID report from the backplane controller through the USB interface; and instruct the USB HID host driver to retrieve the first backplane drive management message from the first USB HID report and send the retrieved first backplane drive management message to the drive management application.

In certain embodiments, the OS is configured to receive the plurality of USB descriptors to the host computer through the USB interface by: sending a request for one of the USB descriptors to the backplane controller through the USB interface; and receiving the requested USB descriptor from the BMC through the USB interface.

In certain embodiments, the USB descriptors comprise a device descriptor, at least one configuration descriptor, at least one interface descriptor, at least one endpoint descriptor, at least one HID descriptor, and at least one report descriptor.

In certain embodiments, the at least one interface descriptor comprises a USB HID class code identifying the backplane controller as the specific HID device, and wherein the at least one report descriptor comprises format codes identifying the predefined format.

In certain embodiments, the OS is configured to recognize the backplane controller as the specific HID device by: identifying the backplane controller as the specific HID device based on the USB HID class code of the at least one interface descriptor; and identifying the predefined format based on the format codes of the at least one report descriptor.

In certain embodiments, the OS is configured to receive the first USB HID report from the backplane controller through the USB interface by: receiving at least one USB data packet of the first USB HID report from the backplane controller through the USB interface; and instructing the USB HID host driver to combine the at least one USB data packet to generate the first USB HID report.

In certain embodiments, the OS is configured to send the second USB HID report to the backplane controller through the USB interface by instructing the USB HID host driver to: generate at least one USB data packet from the second USB HID report; and send the at least one USB data packet of the second USB HID report to the host computer through the USB interface.

Certain aspects of the present disclosure direct to a computer-implemented method of controlling a backplane controller with a host computer. In certain embodiments, the method includes: sending, from the backplane controller, a plurality of universal serial bus (USB) descriptors to the host computer through a USB interface such that the host computer recognizes the backplane controller as a specific human interface device (HID) device based on the plurality of USB descriptors, wherein the backplane controller is connected to the host computer via the USB interface; instructing, at the backplane controller, a USB HID device driver to generate a first USB HID report in a predefined format based on the USB descriptors, wherein the predefined format comprises a USB header, report data, and a USB footer; generating, at the backplane controller, a first backplane drive management message as the report data of the first USB HID report; send-ing, from the backplane controller, the first USB HID report generated by the USB HID device driver to the host computer through the USB interface; receiving, at the backplane controller, a second USB HID report in the predefined format from the host computer through the USB interface; instructing, at the backplane controller, the USB HID device driver to retrieve the report data from the second USB HID report, wherein the retrieved report data is a second backplane drive management message; and processing, at the backplane controller, the second backplane drive management message.

In certain embodiments, each of the first USB HID report and the second USB HID report comprises at least one USB data packet.

In certain embodiments, the backplane controller is configured to send the plurality of USB descriptors to the host computer through the USB interface by: receiving a request for one of the USB descriptors from the host computer through the USB interface; and sending, in response to the request, the requested USB descriptor to the host computer through the USB interface. In certain embodiments, the backplane controller is configured to receive the second USB HID report from the host computer through the USB interface by: receiving at least one USB data packet of the second USB HID report from the host computer through the USB interface; and instructing the USB HID device driver to combine the at least one USB data packet to generate the second USB HID report. In certain embodiments, the backplane controller is configured to send the first USB HID report to the host computer through the USB interface by instructing the USB HID device driver to: generate at least one USB data packet from the first USB HID report; and send the at least one USB data packet of the first USB HID report to the host computer through the USB interface.

In certain embodiments, the host computer includes: a host processor configured to control operation of the host computer; and a storage device configured to store a drive management application, an operating system (OS), and a USB HID host driver. The drive management application, when executed at the host processor, is configured to: receive and process the first backplane drive management message received from the OS; generate the second backplane drive management message as the report data of the second USB HID report; and send the second backplane drive management message to the OS. The OS, when executed at the host processor, is configured to: when the backplane controller is connected to the host computer via the USB interface, receive the plurality of USB descriptors from the backplane controller through the USB interface, and recognize the backplane controller as the specific HID device to receive the second USB HID report based on the plurality of USB descriptors; receive the second backplane drive management message from the drive management application; instruct the USB HID host driver to generate the second USB HID report from the second backplane drive management message in the predefined format based on the plurality of USB descriptors; send the second USB HID report generated by the USB HID host driver to the backplane controller through the USB interface; receive the first USB HID report from the backplane controller through the USB interface; and instruct the USB HID host driver to retrieve the first backplane drive management message from the first USB HID report and send the retrieved first backplane drive management message to the drive management application.

In certain embodiments, the USB descriptors comprise a device descriptor, at least one configuration descriptor, at least one interface descriptor, at least one endpoint descriptor, at least one HID descriptor, and at least one report descriptor.

In certain embodiments, the at least one interface descriptor comprises a USB HID class code identifying the backplane controller as the specific HID device, and wherein the at least one report descriptor comprises format codes identifying the predefined format.

In certain embodiments, the OS is configured to receive the plurality of USB descriptors to the host computer through the USB interface by: sending a request for one of the USB descriptors to the backplane controller through the USB interface; and receiving the requested USB descriptor from the BMC through the USB interface. In certain embodiments, the OS is configured to recognize the backplane controller as the specific HID device by: identifying the backplane controller as the specific HID device based on the USB HID class code of the at least one interface descriptor; and identifying the predefined format based on the format codes of the at least one report descriptor. In certain embodiments, the OS is configured to receive the first USB HID report from the backplane controller through the USB interface by: receiving at least one USB data packet of the first USB HID report from the backplane controller through the USB interface; and instructing the USB HID host driver to combine the at least one USB data packet to generate the first USB HID report.

Certain aspects of the present disclosure direct to a non-transitory computer readable medium storing computer executable codes. The codes, when executed at a processor, are configured to: send, from a backplane controller, a plurality of universal serial bus (USB) descriptors to a host computer through a USB interface such that the host computer recognizes the backplane controller as a specific human interface device (HID) device based on the plurality of USB descriptors, wherein the backplane controller is connected to the host computer via the USB interface; instruct, at the backplane controller, a USB HID device driver to generate a first USB HID report in a predefined format based on the USB descriptors, wherein the predefined format comprises a USB header, report data, and a USB footer; generate, at the backplane controller, a first backplane drive management message as the report data of the first USB HID report; send, from the backplane controller, the first USB HID report generated by the USB HID device driver to the host computer through the USB interface; receive, at the backplane controller, a second USB HID report in the predefined format from the host computer through the USB interface; instruct, at the backplane controller, the USB HID device driver to retrieve the report data from the second USB HID report, wherein the retrieved report data is a second backplane drive management message; and process, at the backplane controller, the second backplane drive management message.

In certain embodiments, each of the first USB HID report and the second USB HID report comprises at least one USB data packet.

In certain embodiments, the codes are configured to send, from the backplane controller, the plurality of USB descriptors to the host computer through the USB interface by: receiving a request for one of the USB descriptors from the host computer through the USB interface; and sending, in response to the request, the requested USB descriptor to the host computer through the USB interface. In certain embodiments, the codes are configured to receive, at the backplane controller, the second USB HID report from the host computer through the USB interface by: receiving at least one USB data packet of the second USB HID report from the host computer through the USB interface; and instructing the USB HID device driver to combine the at least one USB data packet to generate the second USB HID report. In certain embodiments, the codes are configured to send, from the backplane controller, the first USB HID report to the host computer through the USB interface by instructing the USB HID device driver to: generate at least one USB data packet from the first USB HID report; and send the at least one USB data packet of the first USB HID report to the host computer through the USB interface.

In certain embodiments, the host computer includes: a host processor configured to control operation of the host computer; and a storage device configured to store a drive management application, an operating system (OS), and a USB HID host driver. The drive management application, when executed at the host processor, is configured to: receive and process the first backplane drive management message received from the OS; generate the second backplane drive management message as the report data of the second USB HID report; and send the second backplane drive management message to the OS. The OS, when executed at the host processor, is configured to: when the backplane controller is connected to the host computer via the USB interface, receive the plurality of USB descriptors from the backplane controller through the USB interface, and recognize the backplane controller as the specific HID device to receive the second USB HID report based on the plurality of USB descriptors; receive the second backplane drive management message from the drive management application; instruct the USB HID host driver to generate the second USB HID report from the second backplane drive management message in the predefined format based on the plurality of USB descriptors; send the second USB HID report generated by the USB HID host driver to the backplane controller through the USB interface; receive the first USB HID report from the backplane controller through the USB interface; and instruct the USB HID host driver to retrieve the first backplane drive management message from the first USB HID report and send the retrieved first backplane drive management message to the drive management application.

In certain embodiments, the USB descriptors comprise a device descriptor, at least one configuration descriptor, at least one interface descriptor, at least one endpoint descriptor, at least one HID descriptor, and at least one report descriptor. In certain embodiments, the at least one interface descriptor comprises a USB HID class code identifying the backplane controller as the specific HID device, and wherein the at least one report descriptor comprises format codes identifying the predefined format.

In certain embodiments, the OS is configured to receive the plurality of USB descriptors to the host computer through the USB interface by: sending a request for one of the USB descriptors to the backplane controller through the USB interface; and receiving the requested USB descriptor from the BMC through the USB interface. In certain embodiments, the OS is configured to recognize the backplane controller as the specific HID device by: identifying the backplane controller as the specific HID device based on the USB HID class code of the at least one interface descriptor; and identifying the predefined format based on the format codes of the at least one report descriptor. In certain embodiments, the OS is configured to receive the first USB HID report from the backplane controller through the USB interface by: receiving at least one USB data packet of the first USB HID report from the backplane controller through the USB interface; and instructing the USB HID host driver to combine the at least one USB data packet to generate the first USB HID report.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings FIGS. 1-6. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein.

DETAILED DESCRIPTION

Figure 1:
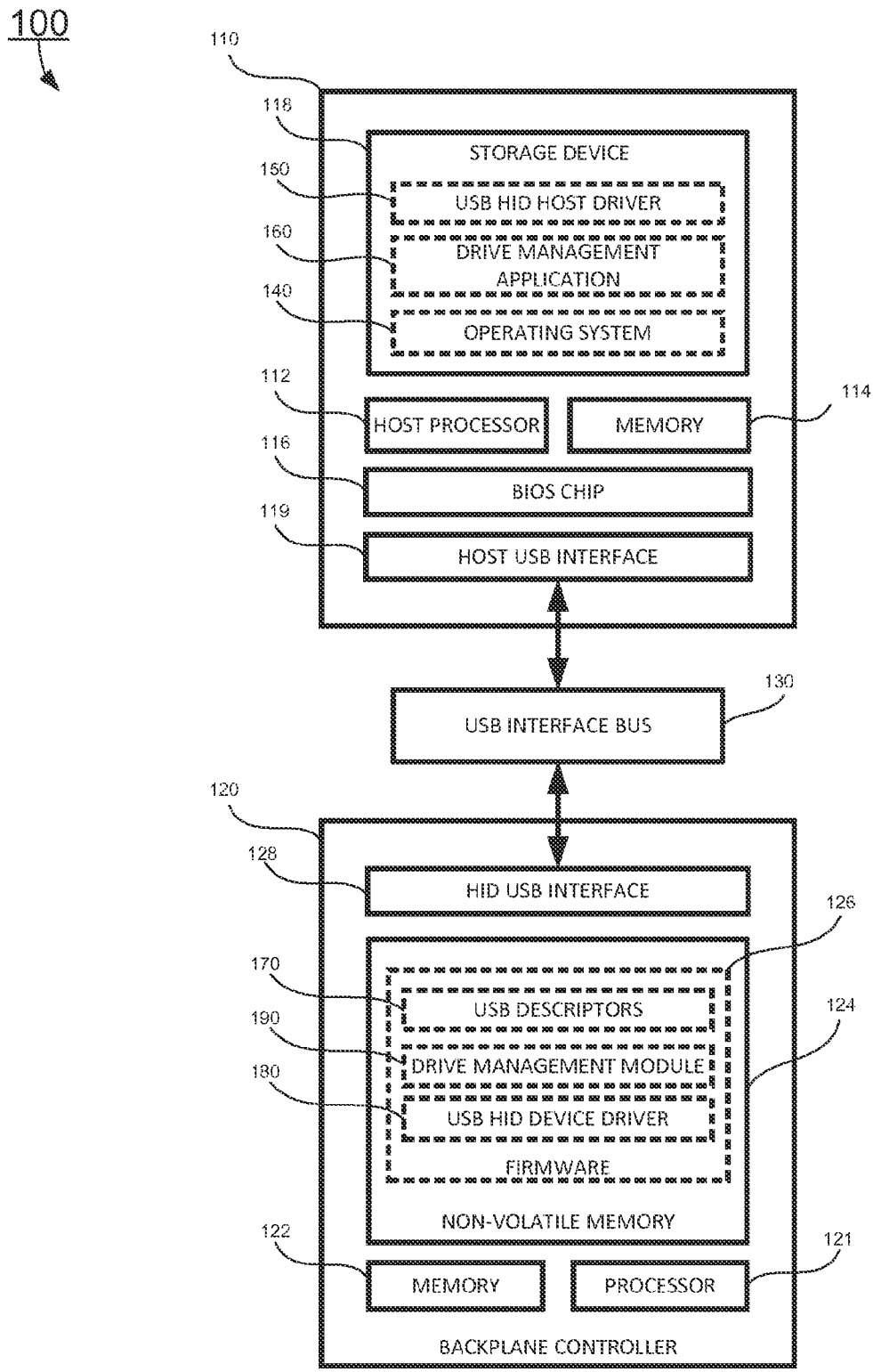
FIG. 1 schematically depicts a computer system having a new communication interface between a host computer and a backplane controller according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

As used herein, the term "headless system" or "headless machine" generally refers to the computer system or machine that has been configured to operate without a monitor (the missing "head"), keyboard, and mouse.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, FIGS. 1-6, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art. Like numbers refer to like elements throughout.

FIG. 1 schematically depicts a computer system 100 according to certain embodiments of the present disclosure. The computer system 100 includes a host computer 110, a backplane controller 120, and a universal serial bus (USB) interface bus 130. The backplane controller 120 is connected to the host computer 110 via the USB interface bus 130.

In certain embodiments, the backplane controller 120 may be connected to the host computer 110 via more than one interface in addition to the USB interface bus 130. For example, the backplane controller 120 may be connected to the host computer 110 via a peripheral component interconnect (PCI) bus interface. For the purpose of the present disclosure, data transfer between the host computer 110 and the backplane controller 120 goes through the USB interface bus 130.

The host computer 110 may be a computing device, such as a general purpose computer or a headless computer. Generally, the host computer 110 includes a baseboard or the "motherboard" (not shown). The baseboard is a printed circuit board to which a multitude of components or devices may be connected by way of a system bus or other electrical communication paths. Although not explicitly shown in FIG. 1, the components on the baseboard are interconnected, and the layout of the components on the baseboard and the manner of the interconnection between the components on the baseboard is herein referred to as the configuration of the baseboard. One of ordinary skill in the art would appreciate that the configuration of the baseboard may be adjusted or changed according to the necessary design or manufacturing requirements.

The components on the baseboard of the host computer 110 include, but not limited to, a host processor 112, a memory 114, a BIOS chip 116, a storage device 118, a host USB interface 119, and other required memory and Input/Output (I/O) modules (not shown). In certain embodiments, the host processor 112, the memory 114, and the BIOS chip 116 may be embedded on the baseboard, or may be connected to the baseboard through at least one interface. In certain embodiments, the interface may be physical hardware interface such as electrical connectors, buses, ports, cables, terminals, or other I/O devices. The host USB interface 119 is used to facilitate the communication between the host computer 110 and all USB devices connected to the host computer 110.

Further, the storage device 118 of the host computer 110 stores various software applications, including an operating system (OS) 140, a USB human interface device (HID) host driver 150, and a drive management application 160. In certain embodiments, the storage device 118 is a non-volatile memory such as read-only memory (ROM), flash memory, secure digital (SD) memory, ferroelectric RAM (F-RAM), and optical discs. Most types of magnetic computer storage devices such as hard disks, floppy disks, and magnetic tape, are ferroelectric RAM type storage devices. In certain embodiments, the host computer 110 may include at least one user input/output device (not shown in FIG. 1) for a user to generate controlling input and output signals of the host computer 110. Examples of the I/O device include keyboards, touch pads, mouse, microphones, display screens, touch screens, or other I/O devices applicable for the host computer 110. Some I/O devices, such as touch screens, are provided for the dual input/output purposes.

The host processor 112 is configured to control operation of the host computer 110. The host processor 112 executes the OS 140 and other applications on the host computer 110. The memory 114 can be a volatile memory, such as the random-access memory (RAM), for storing the data and information during the operation of the host computer 110.

The BIOS chip 116 is an important component in the host computer 110. In certain embodiments, the BIOS chip 116 is a non-volatile memory, such as a flash memory chip, an SD memory, an electrically erasable programmable read-only memory (EEPROM) chip or a complementary metal oxide semiconductor (CMOS) memory.

The BIOS chip 116 stores BIOS codes (not shown, hereinafter the BIOS). The BIOS is configured to perform the startup functions, or the booting functions, for the host computer 110. Examples of the booting functions include, but are not limited to, the initiation and power-on self-test, identifying the system devices, locating the boot loader software on the boot device, loading and executing the boot loader software and giving it control of the OS 140.

The storage device 118 is a non-volatile data storage media for storing the OS 140, the USB HID host driver 150, the drive management application 160, and other applications of the host computer 110. Examples of the storage device 118 may include flash memory, memory cards, USB drives, hard drives, floppy disks, optical drives, or any other types of data storage devices.

The OS 140 can be collective management software managing the operation of the host computer 110. For example, the OS 140 can include a set of functional programs that control and manage operations of the devices connected to the host computer 110. The set of application programs provide certain utility software for the user to manage the host computer 110. In certain embodiments, the OS 140 is operable to multitask, i.e., execute computing tasks in multiple threads, and thus may be any of the following: MICROSOFT CORPORATION's "WINDOWS 95," "WINDOWS CE," "WINDOWS 98," "WINDOWS 2000" or "WINDOWS NT", "WINDOWS Vista,", "WINDOWS 7," and "WINDOWS 8,"

operating systems, IBM's OS/2 WARP, APPLE's MACINTOSH OSX operating system, LINUX, UNIX, etc.

In certain embodiments, the OS 140 may intend to control the backplane controller 120 to perform certain actions. For example, the OS 140 may intend to drive an individual LED, which corresponds to a storage drive controlled by the backplane controller 120, to displaying information regarding the activity, failure, rebuild status, and other information. In this case, the OS 140 is configured to generate certain data, which includes commands for controlling the backplane controller 120 to perform such actions, and sends the commands to the drive management application 160. After the drive management application 160 generates backplane drive management messages corresponding to the data, the OS 140 receives the backplane drive management messages generated by the drive management application 160. Then, the OS 140 sends the backplane drive management messages to the USB HID host driver 150, and instructs the USB HID host driver 150 to generate a USB HID report from each of backplane drive management messages. The USB HID report is in the predefined format based on the information of the USB descriptors 170. After the USB HID host driver 150 generates the USB HID report, the OS 140 controls the USB HID host driver 150 to send the USB HID report to the backplane controller 120 through the USB interface bus 130. Details of the USB HID report will be described later.

In certain embodiments, when the host computer 110 receives a USB HID report from the backplane controller 120 through the USB interface bus 130, the OS 140 instructs the USB HID host driver 150 to retrieve the backplane drive management messages embedded in the first USB HID report. Then the OS 140 sends the retrieved backplane drive management message to the drive management application 160 for processing. After the drive management application 160 processes the backplane drive management messages to generate data recognizable by the OS 140, the drive management application 160 sends the data back to the OS 140 such that the OS 140 may process with the data from the backplane controller 120.

The drive management application 160 is a software implementation to replace the HBA. When the HBA is used, the HBA facilitates the communication between the host computer 110 and the backplane controller 120. In certain embodiments, the HBA provides an operator with detailed information regarding the presence and status of mass storage devices, and provides facilities for generating visual indicators based upon backplane management data received from the HBA of the host computer. For instance, individual LEDs may be driven by the backplane for displaying information regarding the activity, failure, rebuild status, and other information for each of the mass storage devices connected to the backplane. In order to provide these indicators and other types of functionality, a backplane typically provides connections for multiple mass storage devices, such as hard disk drives. The backplane also interfaces with the HBA and provides an interface through which the HBA may communicate with the mass storage devices. The backplane also may receive and transmit backplane management data to and from the HBA. Backplane management data is any data relating to the provision of backplane management services by a backplane. When a HBA is used, the HBA allows the host computer 110 to monitor and manage the storage drives 1000-1 through 1000-8 installed on the backplane controller 120. By replacing the HBA, the drive management application 160 monitors and manages the backplane controller 120 and the storage drives 1000-1 through 1000-8.

In certain embodiments, the drive management application 160 allows a user to monitor and manage drives installed on the backplane where the backplane controller 120 is installed. The monitoring and management of drives installed on the backplane include but not limited to monitoring the status of each drive, powering on/powering off each of the drive, controlling the blinking patterns of each drive, reading data from each drive, writing data to each drive, verifying and updating the firmware of the backplane controller.

In certain embodiments, the drive management application 160 generates and processes backplane drive management messages, which are interpretable by the backplane controller 120. In certain embodiments, the backplane drive management messages may include control commands and control data for monitoring and managing a plurality of storage drives installed on a backplane where the backplane controller is installed. In certain embodiments, when the OS 140 generates data including the commands intended to control the backplane controller 120, the OS 140 may send the data to the drive management application 160. Upon receiving the data, the drive management application 160 generates corresponding backplane drive management messages from the data, and sends the backplane drive management messages back to the OS 140. When the OS 140 receives the backplane drive management messages from the backplane controller 120 or any other peripheral devices, the OS 140 sends the received backplane drive management messages to the drive management application 160. The drive management application 160 processes the backplane drive management messages to generate data recognizable by the OS 140, and then sends the data back to the OS 140 for further processing.

In certain embodiments, the drive management application 160 is separated from the OS 140 as an independent program. In certain embodiments, the drive management application 160 can be a part of the OS 140, which is compatible to the USB specification for generating the backplane drive management messages.

In certain embodiments, the drive management application 160 performs conversion between backplane drive management messages interpretable by the backplane controller 120 and the command recognizable by the OS 140. The drive management application 160 is independent from the USB features of the host computer 110. The drive management application 160 does not need to change the codes or software modules to be compatible to the USB standard.

The USB HID host driver 150 is a computer program that operates or controls the USB HID data transfer to and from HID devices attached to the host computer 110 via the USB interface bus 130. The USB HID host driver 150 is instructed by the OS 140 to communicate with any USB HID devices through the USB interface bus 130.

For USB HID devices, data transfer is implemented by USB HID reports (hereinafter the reports). A report is a data structure defined by the USB HID Specification. In actual data transfer, a report is converted to one or more USB data packets. Generally, when the OS 140 sends data to the USB HID host driver 150 for transferring the data to a particular HID device, the OS 140 will instruct the USB HID host driver 150 to generate a report in a format recognizable by the particular HID device. After generating the report, the USB HID host driver 150 converts the report to the USB data packets such that the OS 140 may send the USB data packets to the particular HID device through USB connection. For example, as discussed above, based on the information of the USB descriptors 170, the OS 140 may recognize the backplane controller 120 as the specific HID device, and recognize a predefined format of the report for transferring data to the backplane controller 120 as the specific HID device. Thus, when the OS 140 intends to send the backplane drive management messages to the backplane controller 120, the OS 140 sends the backplane drive management messages to the USB HID host driver 150, and instructs the USB HID host driver 150 to generate a report in the predefined format recognizable by the backplane controller 120. After generating the report, the USB HID host driver 150 converts the report to the USB data packets such that the OS 140 may send the USB data packets to the backplane controller 120 through the USB interface bus 130.

On the other hand, when the host computer 110 receives USB data packets from a particular HID device, the OS 140 instructs the USB HID host driver 150 to combine USB data packets to generate the report. Then, the OS 140 instructs the USB HID host driver 150 to retrieve data from the report based on a format defined by the particular HID device. For example, when the host computer 110 receives USB data packets from the backplane controller 120, which serves as the specific HID device, the OS 140 instructs the USB HID host driver 150 to combine the USB data packets to generate the report. Since the report is in the predefined format recognizable by the backplane controller 120, the OS 140 instructs the USB HID host driver 150 to retrieve the backplane drive management message from the report based on the predefined format.

In certain embodiments, data transfer under the HID class has a maximum packet size rate for full speed transfer at 64 bytes/ms. A typical backplane drive management message may be shorter than 64 bytes. In this case, a report generated from the backplane drive management message by the USB HID host driver 150 can be essentially one USB data packet, and there is no need for further converting the report to USB data packets. Specifically, the USB HID host driver 150 may embed the backplane drive management message directly with a packet header and a packet footer to form the single packet report. In other words, the report or the packet is formed by attaching the packet header at the front of the backplane drive management message, and attaching the packet footer at the end of the backplane drive management message.

As discussed earlier, the USB HID host driver 150 operates under the instruction issued by the OS 140. In certain embodiments, the USB HID host driver 150 may process the backplane drive management messages or any data to generate reports according to the predefined format. Thus, the USB HID host driver 150 may maintain its original USB processing functionalities without recognizing that the data to be processed to generate the reports includes backplane drive management messages.

USB interface has been adopted as an industrial standard by various computer platforms such as Windows, iOS, Linux, Unix, and many other computer platforms. The USB specification also provides a variety of USB HID host drivers. In certain embodiments, the host computer 110 may use one of the USB HID host drivers provided by the OS 140 as the USB HID host driver 150. In certain embodiments, the host computer 110 may use a customized USB HID host driver 150, which is separated from the OS 140.

The USB interface bus 130 is a standardized interface under the USB industry standard that defines the cables, connectors and communications protocols used in a bus for connection, communication, and power supply between computers and electronic devices. USB was designed to standardize the connection of computer peripherals (including keyboards, pointing devices, digital cameras, printers, portable media players, disk drives and network adapters) to personal computers, both to communicate and to supply electric power. The USB interface bus 130 has become commonplace on other devices, such as smartphones, PDAs and video game consoles. USB has effectively replaced a variety of earlier interfaces, such as serial and parallel ports, as well as separate power chargers for portable devices. Currently, USB allows bi-directional communications between the host computer 110 and the USB devices, as USB 3.0 allows for device-initiated communications towards the host.

The functionality of USB devices is defined by class codes, communicated to the USB host to affect the loading of suitable software driver modules for each connected device. This provides for adaptability and device independence of the host to support new devices from different manufacturers. For example, class code 0x03h defines the USB HID device class (hereinafter the HID class). The HID class specifies a device class, or a type of computer hardware, for HIDs such as a keyboard, a mouse, a joystick or a game controller, and alphanumeric display devices.

The USB HID class specifications allow for myriad other devices under the HID class. Some examples are automobile simulation controllers, exercise machines, telephony devices, thermometers, audio controls and medical instrumentation. In certain embodiments, a device without human interface may also declare itself under the HID class. For example, uninterruptible power supplies may declare themselves under this class, despite the fact they often have no human interface at all. In other words, any device can be a HID class device as long as a designer meets the HID class logical specifications and declare itself under the HID class.

USB device communication is based on pipes (logical channels). A pipe is a connection from the host controller at the host computer 110 to a logical entity found on a USB device. The logical entity is generally named an "endpoint." Because pipes correspond 1-to-1 to endpoints, the terms are sometimes used interchangeably. A USB device has a default endpoint zero, and could have up to 32 endpoints. Of the 32 endpoints, 16 are IN for data transaction from the USB device to the host computer 110, and 16 are OUT for data transaction from the host computer 110 to the USB device. An endpoint is defined and numbered by the device during initialization (the period after physical connection called "enumeration") and so is relatively permanent, whereas a pipe may be opened and closed.

There are two types of pipes: stream and message pipes. A message pipe is bi-directional and is used for control transfers. Message pipes are typically used for short, simple commands to the device, and a status response, used, for example, by the bus control pipe number zero, which corresponds to the endpoint zero. A stream pipe is a uni-directional pipe connected to a uni-directional endpoint that transfers data using an isochronous, interrupt, or bulk transfer. Generally, a USB HID device requires one control endpoint (which can be endpoint zero) and one IN interrupt endpoint.

An endpoint of a pipe is addressable with a tuple (device address, endpoint number) as specified in a TOKEN packet that the host sends when it wants to start a data transfer session. If the direction of the data transfer is from the host to the endpoint, an OUT packet (a specialization of a TOKEN packet) having the desired device address and endpoint number is sent by the host. If the direction of the data transfer is from the device to the host, the host sends an IN packet instead. If the destination endpoint is a uni-directional endpoint whose manufacturer's designated direction does not match the TOKEN packet (e.g., the manufacturer's designated direction is IN while the TOKEN packet is an OUT packet), the TOKEN packet is ignored. Otherwise, it is accepted and the data transaction can start. A bi-directional endpoint, on the other hand, accepts both IN and OUT packets.

Information about a USB device is stored in segments of the non-volatile memory, such as a read-only memory (ROM), of the USB device. These segments are called descriptors. All USB devices have a hierarchy of descriptors which describe to the host information such as what the device is, who makes it, what version of USB it supports, how many ways it can be configured, the number of endpoints and their types, and other information of the USB devices. Common USB and HID related descriptors include device descriptors, configuration descriptors, interface descriptors, endpoint descriptors, HID descriptors and report descriptors. All descriptors are made up of a common format. The first byte of the descriptor is a bLength field, which specifies the length (in bytes) of the descriptor. The second byte of the descriptor is a bDescriptorType field, which indicates the descriptor type. For example, 0x01 refers to a device descriptor, 0x02 refers to a configuration descriptor, 0x04 refers to an interface descriptor, 0x05 refers to an endpoint descriptor, and 0x21 refers to a HID descriptor. If the length of a descriptor is smaller than what the specification defines, then the host shall ignore it. However, if the size of a descriptor is greater than expected, the host will ignore the extra bytes and start looking for the next descriptor at the end of actual length returned. Examples of the descriptors will be described later.

The backplane controller 120 is a specialized microcontroller that manages the interface between system management software and platform hardware. In certain embodiments, the backplane controller 120 may be a service processor (SP). Different types of sensors can be built into the host computer 110, and the backplane controller 120 reads these sensors to obtain parameters such as temperature, cooling fan speeds, power status, OS status, etc.

A backplane is a circuit board with connectors and power circuitry into which storage drives are attached. They can have multiple slots, each of which can be populated with a storage drive. Typically the backplane is equipped with LEDs which by their color and activity indicate the status of the storage drives connected to the backplane. A storage drive's LED will emit a particular color or blink pattern to indicate its current status such as a storage drive is attached to the backplane, working, accessing data, or in fail state. A backplane controller interfaces with the host computer via the HID USB interface through which the host computer 110 may communicate with the mass storage devices. The backplane controller also may receive and transmit backplane management data to and from host computer 110. The backplane controller 120 monitors and controls the operation status of the storage devices mounted on the backplane, and the LEDs associated with these storage drives.

In certain embodiments, the backplane controller 120 includes a processor 121, a memory 122, a non-volatile memory 124, and an HID USB interface 128. The non-volatile memory 124 stores firmware 126 of the backplane controller. The backplane controller's firmware 126 includes at least USB descriptors 170, a drive management module 190, and a USB HID device driver 180. The HID USB interface 128 is used to facilitate communication between the backplane controller 120 (an HID USB device) and the host computer 110 via the USB interface bus 130.

The processor 121 is a processor configured to control operation of the backplane controller 120. The processor 121 executes the backplane controller's firmware and other applications on the backplane controller 120. The memory 122 can be a volatile memory, such as the random-access memory (RAM), for storing the data and information during the operation of the backplane controller 120.

When the backplane controller 120 is connected to the host computer 110 via the HID USB interface 128 of the backplane controller 120, the USB interface bus 130, and the host USB interface 119 of the host computer 110, the OS 140 of the host computer 110 is configured to recognize the backplane controller 120 as a specific HID device. Specifically, the OS 140 requests and receives the USB descriptors 170 from the backplane controller 120 through the USB interface bus 130. Based on information of the USB descriptors 170, the OS 140 may recognize the backplane controller 120 as the specific HID device, and recognize a predefined format of a USB HID report for transferring data to the specific HID device (i.e. the backplane controller 120). Details of the USB descriptors 170 and the predefined format will be explained later.

The USB descriptors 170 refer to a collection of descriptors to define the backplane controller 120 as a USB HID device. Common USB and HID related descriptors include device descriptors, configuration descriptors, interface descriptors, endpoint descriptors, HID descriptors and report descriptors. All descriptors are made up of a common format.

Figure 2:
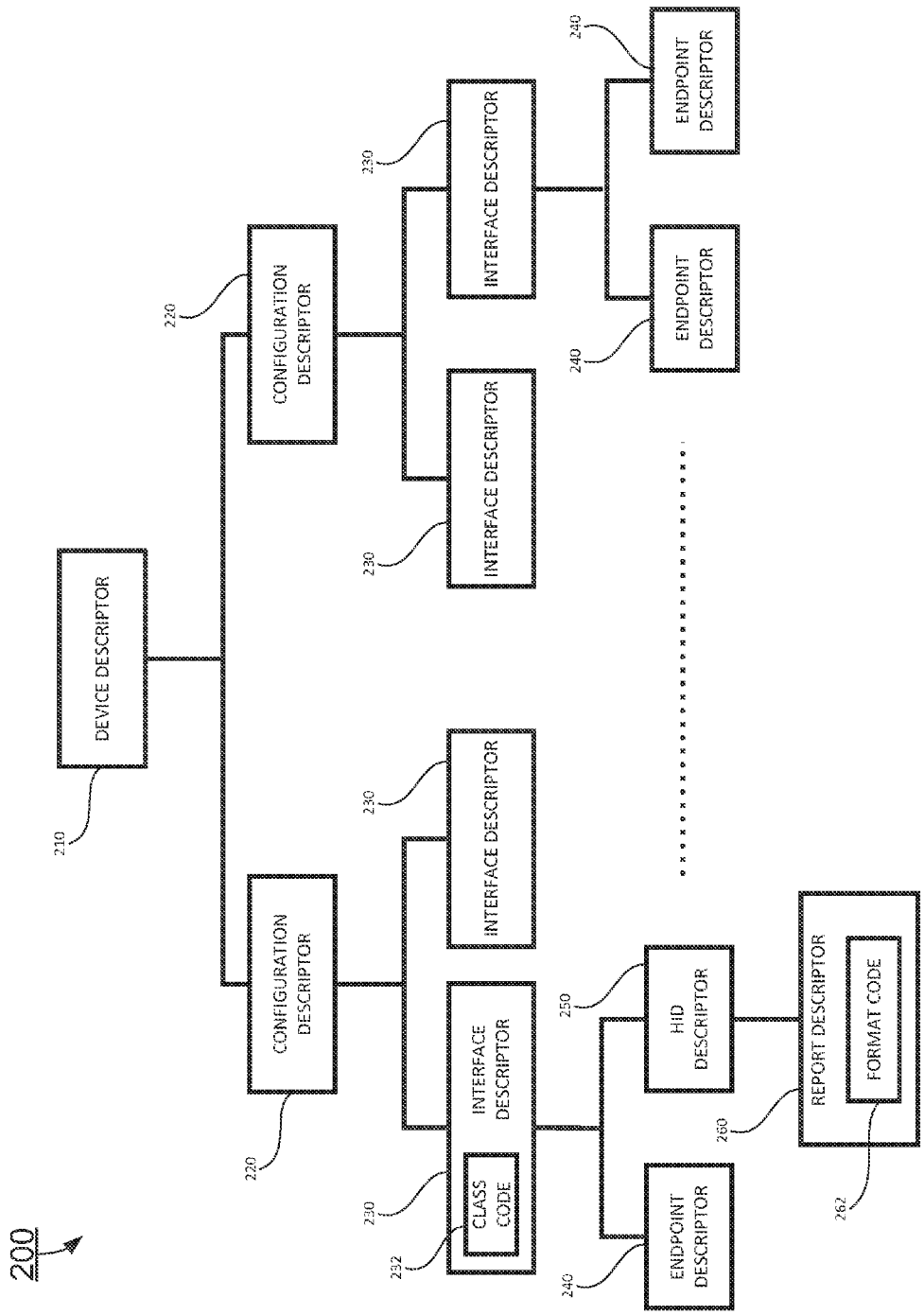
FIG. 2 schematically depicts a descriptor hierarchy of the backplane controller as a specific human interface device (HID) device according to certain embodiments of the present disclosure.

FIG. 2 schematically depicts a descriptor hierarchy of the backplane controller as a specific HID device according to certain embodiments of the present disclosure. In certain embodiments, for each USB HID device, such as the backplane controller 120, the descriptor hierarchy includes a device descriptor 210, followed by one or more configuration descriptors 220. Each configuration descriptor 220 may be followed by one or more interface descriptors 230. Each interface descriptor 230 may be followed by one or more endpoint descriptors 240 and one or more HID descriptors 250. Each HID descriptor 250 is followed by a report descriptor 260.

The device descriptor 210 of a USB device represents the entire device. Thus, a USB device, such as the backplane controller 120, can only have one device descriptor 210. The device descriptor 210 specifies the basic yet important information about the USB device such as the supported USB version, maximum packet size, vendor and product IDs and the number of possible configurations the device can have.

In certain embodiments, for the backplane controller 120, the device descriptor 210 can be a 12 to 18 bytes descriptor. The first byte (offset 0) of the device descriptor 210 is a bLength field, which specifies the length of the descriptor (for example, 0x12 indicates that the length of the device descriptor 210 is 12 bytes). The second byte (offset 1) of the device descriptor 210 is a bDescriptorType field, which indicates the descriptor type (0x01). The fifth byte of the device descriptor 210 is a bDeviceClass field, and the sixth byte of the device descriptor 210 is a bDeviceSubClass field. The bDeviceClass and bDeviceSubClass fields respectively indicate the device class code and subclass code assigned by the USB. It should be noted that for a USB HID device, the HID class is not defined in the bDeviceClass field of device descriptor 210, and the bDeviceClass field is generally assigned the value of 0x00. The eighth byte of the device descriptor 210 is a bMaxPacketSize0 field, which indicates the maximum packet size for endpoint zero. Only 8, 16, 32 and 64 are valid values for the bMaxPacketSize0 field. For example, 0x64 indicates the maximum packet size of endpoint zero of the USB device is 64 bytes. Definitions and sample values of other fields of the device descriptor 210 can be found in the USB Specification, and are not hereinafter described in detail.

In certain embodiments, the bMaxPacketSize0 field of the device descriptor 210 indicates the maximum packet size for endpoint zero. In certain embodiments, the bMaxPacketSize0 field of the device descriptor 210 may include the value 0x64 to indicate the maximum packet size for endpoint zero as 64 bytes. When the OS 140 of the host computer 110 receives the device descriptor 210, the OS 140 may interpret the value 0x64 stored in the bMaxPacketSize0 field of the device descriptor 210, and recognize the maximum packet size for endpoint zero of the backplane controller 120 to be 64 bytes.

The configuration descriptor 220 specifies the configuration of the USB device, such as how the USB device is powered, what the maximum power consumption is, and the number of interfaces it has. Typically, each USB device has one configuration descriptor 220. In certain embodiments, a USB device can have one or more configuration descriptors 220 to indicate different configurations of the USB device. In certain embodiments, the backplane controller 120, which serves as a USB HID device, may have one or more configuration descriptors 220.

In certain embodiments, for the backplane controller 120, the configuration descriptor 220 can be a 9-byte descriptor. The first byte (offset 0) of the configuration descriptor 220 is a bLength field, which specifies the length of the descriptor (for example, 0x09 indicates that the length of the configuration descriptor 220 is 9 bytes). The second byte (offset 1) of the configuration descriptor 220 is a bDescriptorType field, which indicates the descriptor type (0x02). The third and fourth bytes (offset 2) of the configuration descriptor 220 constitute a 2-byte wTotalLength field, which indicates the total combined length of all returned descriptors (including the configuration descriptor 220 itself, the one or more interface descriptors 230, the one or more endpoint descriptors 240 and the one or more HID descriptors 250) under the configuration. The fifth byte (offset 4) of the configuration descriptor 220 is a bNumInterfaces field, which indicates the number of interfaces supported by the configuration. Definitions and sample values of other fields of the configuration descriptor 220 can be found in the USB Specification, and are not hereinafter described in detail.

The interface descriptor 230 indicates the functions of an interface, which is formed by one or more endpoints as a group. In other words, the interface descriptor 230 is essentially a header or grouping of the endpoints into a functional group performing a single feature of the USB device. The interface descriptor 230 is also the descriptor for identifying a USB device as belonging to one of a finite number of classes, such as the HID class. A USB/HID class device uses a corresponding HID class device driver to retrieve and route all data. In certain embodiments, the backplane controller 120, which serves as a USB HID device, may have one or more interface descriptors 230.

In certain embodiments, for the backplane controller 120, the interface descriptor 230 can be a 9-byte descriptor. The first byte (offset 0) of the interface descriptor 230 is a bLength field, which specifies the length of the descriptor (for example, 0x09 indicates that the length of the interface descriptor 230 is 9 bytes). The second byte (offset 1) of the interface descriptor 230 is a bDescriptorType field, which indicates the descriptor type (0x04). The fifth byte (offset 4) of the interface descriptor 230 is a bNumEndpoints field, which indicates the number of endpoints used by the interface. The sixth byte (offset 5) of the interface descriptor 230 is a bInterfaceClass field, which indicates the class code assigned by the USB. For example, 0x03 indicates that the interface is in the HID class. Definitions and sample values of other fields of the interface descriptor 230 can be found in the USB Specification, and are not hereinafter described in detail.

In certain embodiments, the bInterfaceClass field of the interface descriptor 230 is used to indicate the class code of the backplane controller 120. Thus, a bInterfaceClass field 232 of the interface descriptor 230 includes the value 0x03 of the USB HID class code to identify the backplane controller 120 as the specific HID device. When the OS 140 of the host computer 110 receives the interface descriptor 230, the OS 140 may interpret the value 0x03 of the USB HID class code stored in the bInterfaceClass field 232 of the interface descriptor 230, and recognize the backplane controller 120 as the specific HID device.

The endpoint descriptor 240 is used to describe an endpoint other than endpoint zero. The endpoint zero is always assumed to be a control endpoint and is configured before any descriptors are even requested. The host will use the information returned from these descriptors to determine the bandwidth requirements of the bus. In certain embodiments, the backplane controller 120, which serves as a USB HID device, may have one or more endpoint descriptors 240 to define one or more endpoints other than endpoint zero.

In certain embodiments, the endpoint descriptor 240 can be a 7-byte descriptor. The first byte (offset 0) of the endpoint descriptor 240 is a bLength field, which specifies the length of the descriptor (for example, 0x07 indicates that the length of the endpoint descriptor 240 is 7 bytes). The second byte (offset 1) of the endpoint descriptor 240 is a bDescriptorType field, which indicates the descriptor type (0x05). The third byte (offset 2) of the endpoint descriptor 240 is a bEndpointAddress field, which describes the address of the endpoint on the USB device. The bits 0-3 of the bEndpointAddress field indicates the endpoint number, and the bit 7 of the bEndpointAddress field indicates the direction of the endpoint (0 for an OUT endpoint, and 1 for an IN endpoint), which is ignored for a bi-directional control endpoint. For example, 10000001B indicates that the endpoint number 1 is an IN endpoint. The fourth byte (offset 3) of the endpoint descriptor 240 is a bmAttributes field, which indicates the attributes of the endpoint. The bits 0-1 of the bmAttributes field show the transfer type of the endpoint, where 00 indicates control transfer, 01 indicates isochronous transfer, 10 indicates bulk transfer, and 11 indicates interrupt transfer. The sixth byte (offset 5) of the interface descriptor 230 is a bInterfaceClass field, which indicates the class code assigned by the USB. For example, 0x03 indicates that the interface is in the HID class. Definitions and sample values of other fields of the endpoint descriptor 240 can be found in the USB Specification, and are not hereinafter described in detail.

The HID descriptor 250 identifies the basic information of the HID device and the related descriptors, such as the report descriptor 260, for describing the HID device. In other words, the HID descriptor 250 is essentially a header of the report descriptor 260 of the HID device. The HID Class Specification allows implementation of self-describing input devices, which means the HID descriptor 250 and its corresponding report descriptor 260 may contain information to understand the report protocol the HID device uses to send information. In certain embodiments, the backplane controller 120, which serves as a USB HID device, may have one or more HID descriptor 250 to define the basic information of the backplane controller 120 as the HID device.

In certain embodiments, the HID descriptor 250 can be a 9-byte descriptor. The first byte (offset 0) of the HID descriptor 250 is a bLength field, which specifies the length of the descriptor (for example, 0x09 indicates that the length of the HID descriptor 250 is 7 bytes). The second byte (offset 1) of the HID descriptor 250 is a bDescriptorType field, which indicates the descriptor type (0x21). The sixth byte (offset 5)

of the HID descriptor 250 is a bNumDescriptors field, which indicates the number of HID class descriptors (such as the report descriptor 260) to follow. Each HID descriptor 250 must be followed by at least one report descriptor 260, so the value of the bNumDescriptors field must be at least one. For example, if the HID descriptor 250 is followed by a report descriptor 260 and no other HID class descriptors, the value of the bNumDescriptors field is 0x01. The seventh byte (offset 6) of the HID descriptor 250 is a bDescriptorType field, which indicates the type of the report descriptor 260. The eighth and ninth bytes (offset 7) of the HID descriptor 250 constitute a wItemLength field, which indicates the total length of the report descriptor 260. Definitions and sample values of other fields of the HID descriptor 250 can be found in the HID Class Specification, and are not hereinafter described in detail.

The report descriptor 260 is the header of a report of the HID device, identifying the format of data transferred by the HID device. Since data is transferred in packets, the report descriptor 260 defines the data packets, such as the size of the packet, and the purpose of each data bit in the packet.

When the backplane controller 120 device is connected to the host computer 110, the OS 140 of the host computer 110 reads the report descriptor 260 from the USB descriptors 170 for the report protocol defined therein. All data transfer between the host computer 110 and the HID device will follow the report protocol. Definitions and sample values of the report descriptor 260 can be found in the HID Class Specification, and are not hereinafter described in detail.

In certain embodiments, the backplane controller 120 can present itself to the host computer 110 as a specific HID device (e.g. a specific mouse or a specific keyboard). In this case, the backplane controller 120 may have one or more report descriptors 260 to define the format of data transferred between the host computer 110 and the backplane controller 120 as the specific HID device. In certain embodiments, the report descriptor 260 of the backplane controller 120 can include certain format codes 262. The format codes 262 include information to indicate a predefined format of the report used by the backplane controller 120. For example, the format codes 262 may define the report between the backplane controller 120 and the host computer to include a backplane drive management message directly embedded with a packet header at the front and a packet footer at the end to form the single packet report. When the OS 140 of the host computer 110 receives the report descriptor 260, the OS 140 may interpret the format codes 262 of the report descriptor 260, and recognize data to be transferred to or received from the backplane controller 120 in the predefined format based on the information provided by the format codes 262. Thus, the OS 140 may instruct the USB HID host driver 150 to generate reports in the predefined format.

The USB HID device driver 180 is a program that controls USB HID data transfer of the backplane controller 120 to and from the host computer 110, or any other USB devices connected to the backplane controller 120, via the USB interface bus 130. The USB HID device driver 180 is instructed by the firmware 126 to communicate with the host computer 110 or any other USB devices through the USB interface bus 130.

As discussed, for USB HID devices, data transfer is implemented by reports, and in actual data transfer, a report is converted to one or more USB data packets. When the firmware 126 sends data to the USB HID device driver 180 for transferring the data to the particular HID device, the firmware 126 instructs the USB HID device driver 180 to generate a report in a format recognizable by the particular HID device. After generating the report, the USB HID device driver 180 converts the report to the USB data packets such that the firmware 126 may send the USB data packets to the particular HID device through USB connection. For example, after the backplane controller 120 is connected to the host computer 110 via the host USB interface 119, the USB interface bus 130, and the HID USB interface 128, the backplane controller 120 presents itself as the specific HID device for the host computer 110. Thus, when the firmware 126 intends to send backplane drive management messages to the host computer 110, the firmware 126 sends the backplane drive management messages to the USB HID device driver 180, and instructs the USB HID device driver 180 to generate a report in the predefined format. After generating the report, the USB HID device driver 180 converts the report to the USB data packets such that the firmware 126 may send the USB data packets to the host computer 110 through the HID USB interface 128, the USB interface bus 130, and the host USB interface 119.

On the other hand, when the backplane controller 120 receives USB data packets from a particular HID device, the firmware 126 instructs the USB HID device driver 180 to combine USB data packets to generate the report. Then, the firmware 126 instructs the USB HID device driver 180 to retrieve data from the report based on a format defined by the particular HID device. For example, when the backplane controller 120 receives USB data packets from the host computer 110, the firmware 126 instructs the USB HID device driver 180 to combine the USB data packets to generate the report. Since the report is in the predefined format, the firmware 126 instructs the USB HID device driver 180 to retrieve the backplane drive management message from the report based on the predefined format.

In certain embodiments, data transfer under the HID class has a maximum packet size rate for full speed transfer at 64 bytes/ms. A typical backplane drive management message may be shorter than 64 bytes. In this case, a report generated from the backplane drive management message by the USB HID device driver 180 can be essentially a USB data packet, and there is no need for further converting the report to USB data packets. Specifically, the USB HID device driver 180 may embed the backplane drive management message directly with a packet header and a packet footer to form the single packet report. In other words, the report or the packet is formed by attaching the packet header at the front of the backplane drive management message, and attaching the packet footer at the end of the backplane drive management message.

In certain embodiments, the USB HID device driver 180 operates under the instruction issued by the firmware 126. In certain embodiments, the USB HID device driver 180 may process the backplane drive management messages or any data to generate reports according to the predefined format. Thus, the USB HID device driver 180 may maintain its original USB processing functionalities without recognizing that the data to be processed to generate the reports includes backplane drive management messages.

Currently, almost all firmware of backplane controller's available in the market supports the USB standard, and provide a variety of USB HID device drivers. In certain embodiments, the backplane controller 120 may use one of the USB HID device drivers provided by the firmware 126 as the USB HID device driver 180. In certain embodiments, the backplane controller 120 may use a customized USB HID device driver 180.

The drive management module 190 is a program of the backplane controller 120 to generate and process the backplane drive management messages. In certain embodiments, when the drive management module 190 detects certain activities from the storage drives 1000-1 through 1000-8, the drive management module 190 generates corresponding backplane drive management messages to the activities, and sends the backplane drive management messages to the firmware 126 such that the firmware 126 may send the backplane drive management messages to the host computer 110. When the firmware 126 receives backplane drive management messages from the host computer 110, the firmware 126 sends the received backplane drive management messages to the drive management module 190. The drive management module 190 then processes the backplane drive management messages to perform the actions (e.g., displaying signals with the LEDs) indicated by the backplane drive management messages. In certain embodiments, the drive management module 190 receives backplane drive management messages from the drive management application 160 at the host computer 110, and executes the drive management operations at the direction of the user at the host computer 110 to monitor and manage the drives installed on the backplane.

Currently, almost all firmware of backplane controller's available in the market supports the USB specification, and provide a variety of drive management modules 190. In certain embodiments, the drive management module 190 can be a part of the firmware 126. In certain embodiments, the drive management module 190 is separated from the firmware 126 as an independent program.

In certain embodiments, the drive management module 190 performs actions to monitor and manage the drives installed on the backplane. In certain embodiments, the drive management module 190 is independent from the USB features of the backplane controller 120. Thus, the drive management module 190 does not need to change the codes or software modules to be compatible to the USB standard. In other words, the drive management module 190 may maintain its original functionalities without adding features compatible to the USB standard.

Figure 3:
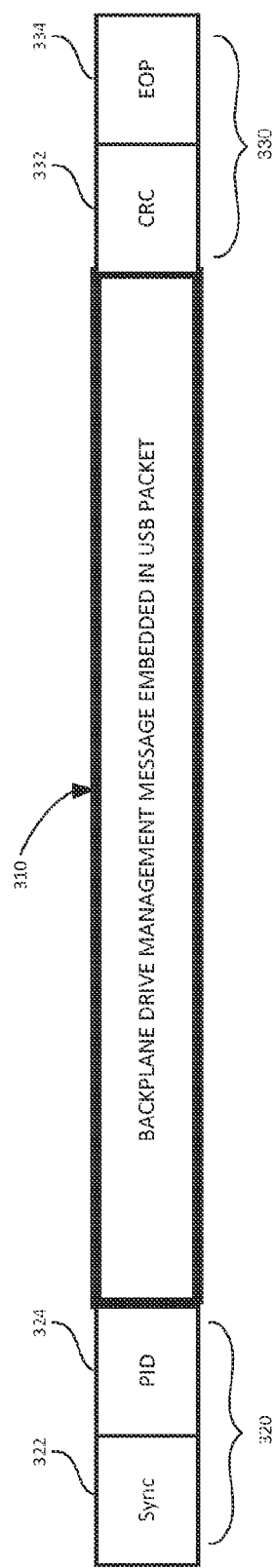
FIG. 3 schematically depicts a backplane drive management message embedded in a USB packet according to certain embodiments of the present disclosure.

FIG. 3 schematically depicts a USB HID data packet in which a backplane drive management message is embedded according to certain embodiments of the present disclosure. In certain embodiments, the drive management message 310 is embedded in a report in the form of a USB data packet without further conversion from the report to the packets. The format of the report is the predefined format based on the information stored in the report descriptor 260 of the backplane controller 120. As shown in FIG. 3, the USB data packet includes a USB header 320 attached at the front of the drive management message 310, the backplane drive management message 310, and a USB footer 330 attached at the end of the drive management message 310.

In certain embodiments, the USB header 320 includes a synchronization (Sync) field 322 and a packet identifier (PID) field 324. The Sync field 322 is an 8-bit (slow or full speed USB) or 32-bit (high speed USB) field used for synchronize the transmitter and the receiver such that the data can be transferred accurately. The PID field 324 is an 8-bit identifier directly following the Sync Field 322, which includes 4 bits of identifiers and 4 bits of complements of the identifier.

In certain embodiments, the USB footer 330 includes a cyclic redundancy checking (CRC) field 332 and an end of packet (EOP) field 334. The CRC field 332 can be a 16-bit CRC16 error detection field used for CRC purposes. The EOP field 334 is a 3-bit packet ending field, including a single ended zero (SE0) for two bits followed by a J for 1 bit.

Data transfer under the HID class completely satisfies the requirements specified by USB 3.1, and the drive management messages are transferred between the host computer 110 and the backplane controller 120 through the USB interface bus 130.

Figure 4:
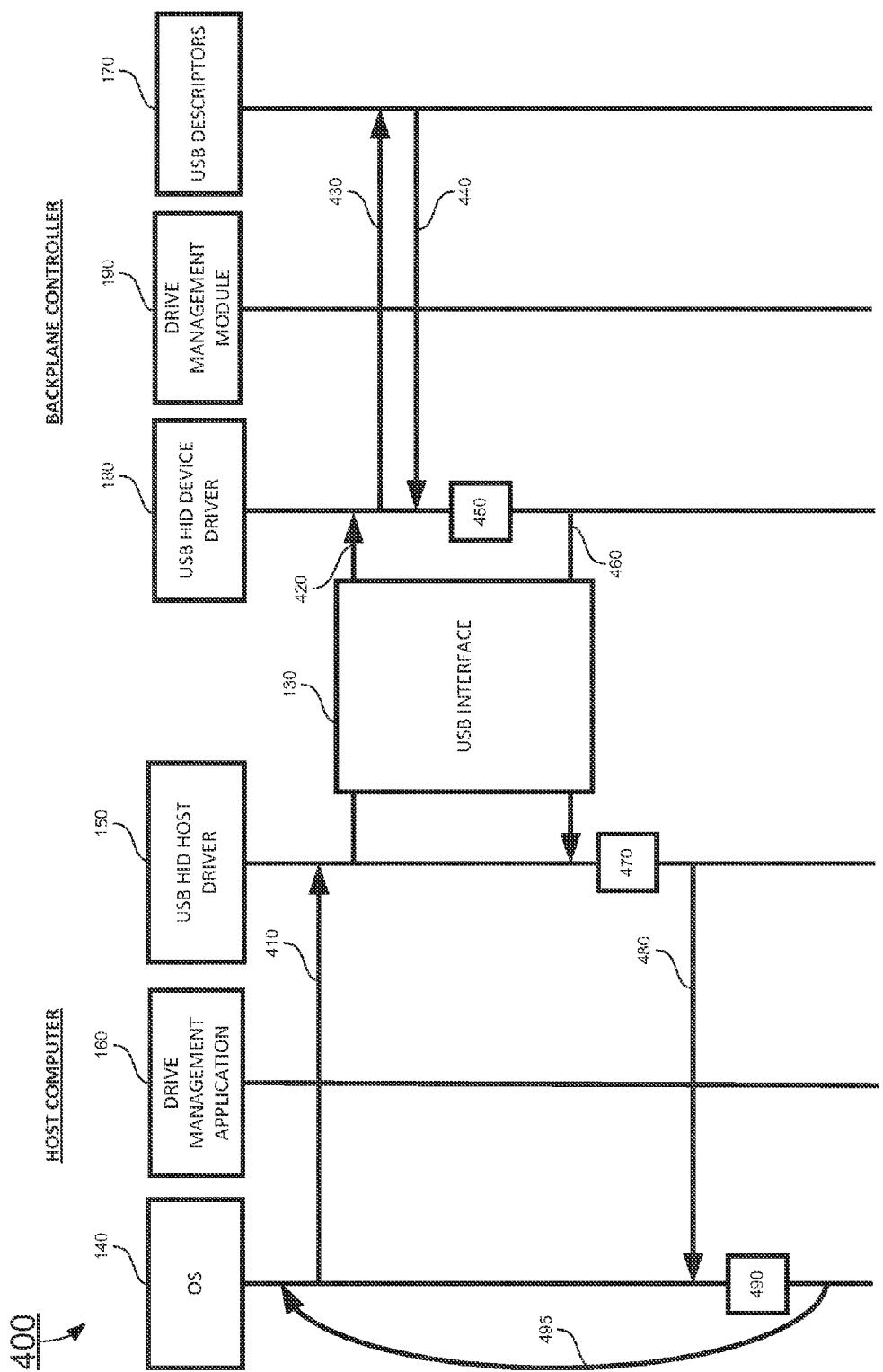
FIG. 4 schematically depicts configuration setup of a backplane controller as a specific HID device at a host computer according to certain embodiments of the present disclosure.

FIG. 4 schematically depicts configuration setup of the backplane controller 120 as a specific HID device at a host computer 110 according to certain embodiments of the present disclosure.

When the backplane controller 120 is connected to the host computer 110 via the host USB interface 119, the USB interface bus 130, and the HID USB interface 128, the OS 140 detects that a device is connected to the host computer 110 via the USB interface bus 130, but does not know at this time whether the device is a HID device or any other USB devices. To determine the type of the backplane controller 120, at procedure 410, the OS 140 instructs the USB HID host driver 150 to access the descriptors of the device. In certain embodiments, the OS 140 accesses one descriptor at a time. At procedure 420, the USB HID host driver 150 sends a Get_Descriptor request to the backplane controller 120 through the host USB interface 119, the USB interface bus 130, and the HID USB interface 128 to get a device descriptor 210.

At the backplane controller 120, when the USB HID device driver 180 receives the Get_Descriptor request for the device descriptor 210, at procedure 430, the USB HID device driver 180 send a request to the USB descriptors 170 for the device descriptor 210. In response, at procedure 440, the USB descriptors 170 return the device descriptor 210 back to the USB HID device driver 180. At procedure 450, the USB HID device driver 180 converts the device descriptor 210 to USB data packets, and at procedure 460, the USB HID device driver 180 sends the USB data packets to the host computer 110 through the HID USB interface 128, the USB interface bus 130, and the host USB interface 119.

At the host computer 110, when the USB HID host driver 150 receives the USB data packets, at procedure 470, the USB HID host driver 150 converts the USB data packets back to the device descriptor 210. At procedure 480, the USB HID host driver 150 sends the device descriptor 210 to the OS 140. At procedure 490, the OS 140 reads the device descriptor 210, and recognizes that the device descriptor 210 has one corresponding configuration descriptor 220.

At procedure 495, the OS 140 goes back to procedure 410 to request for the configuration descriptor 220. The same requesting and interpreting procedures from 410 to 490 repeats until the OS 140 of the host computer 110 reads all of the descriptors (including the device descriptor 210, the configuration descriptor 220, the interface descriptor 230, the endpoint descriptor 240, the HID descriptor 250, and the report descriptor 260) from the USB descriptors 170 of the backplane controller 120. Once the OS 140 reads all of the descriptors, the USB connection between the host computer 110 and the backplane controller 120 is fully established.

In certain embodiments, when the OS 140 reads the interface descriptor 230, the OS 140 can determine from the value (0x03) of the bInterfaceClass field 232 in the interface descriptor 230 that the backplane controller 120 is a HID device. When the OS 140 reads the report descriptor 260, the OS 140 determines from the format codes 262 of the report descriptor 260 that the report being transferred between the host computer 110 and the backplane controller 120 may include a packet header, a backplane drive management message, and a packet footer. During the USB connection, the host computer 110 may send a standard request to the backplane controller 120 to get or change the information of the USB descriptors 170 from the backplane controller 120. For example, the host computer 110 may send a Get_Descriptor request to the backplane controller 120 to get any of the descriptors from the USB descriptors 170 of the backplane controller 120. In certain embodiments, the host computer 110 may issue a Set_Descriptor request to the backplane controller 120 to change the information in any of the descriptors of the USB descriptors 170 of the backplane controller 120.

Figure 5:
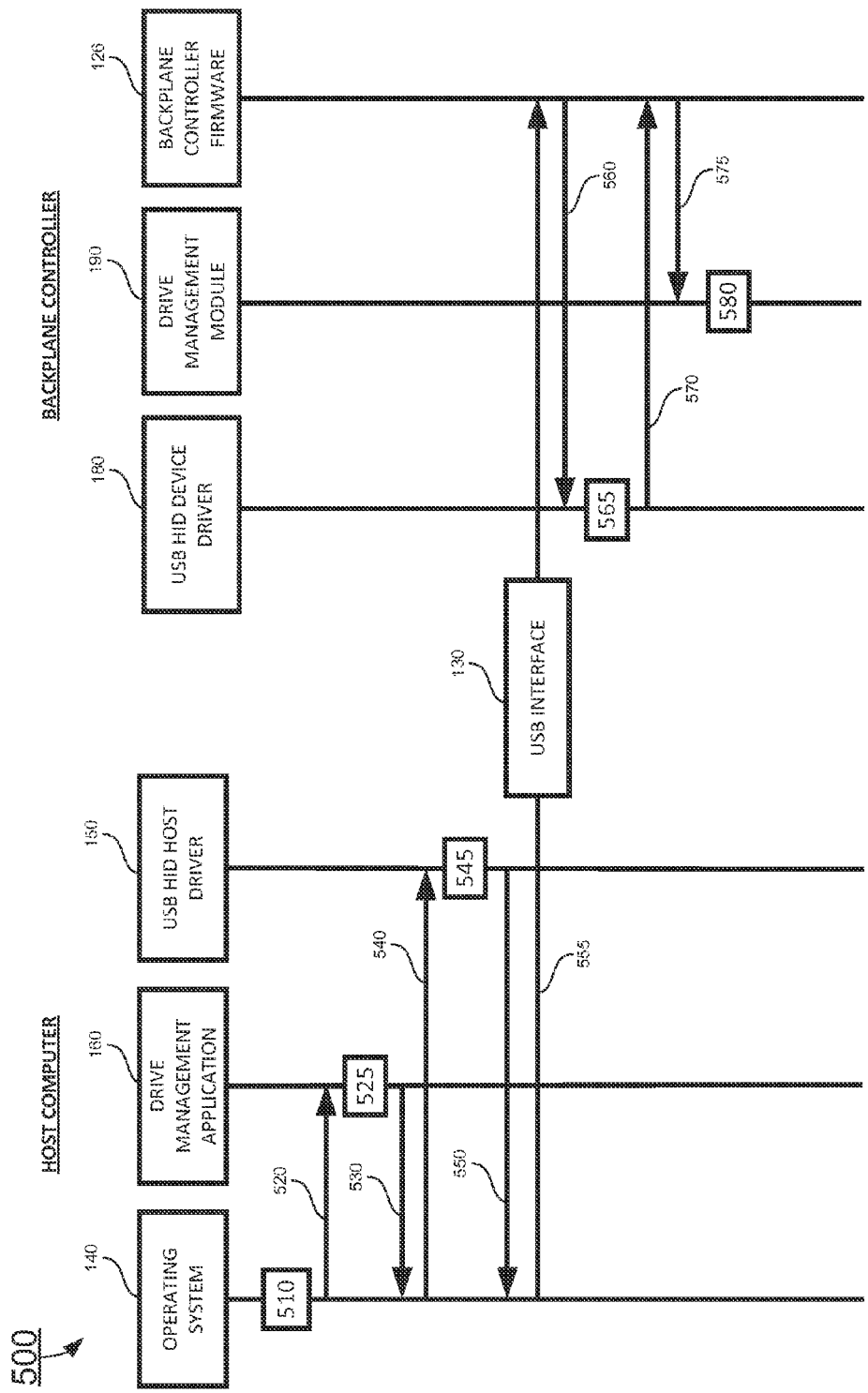
FIG. 5 schematically depicts data transfer from the host computer to the backplane controller according to certain embodiments of the present disclosure.

FIG. 5 schematically depicts data transfer from the host computer 110 to the backplane controller 120 according to certain embodiments of the present disclosure. In certain embodiments, reports, which are in the predefined format according to the format codes 262, are transferred from the host computer 110 to the backplane controller 120. In certain embodiments, the host computer 110 is a source device that initiates the data transfer process, and the backplane controller 120 is a target device that receives the data being transferred.

At procedure 510, the OS 140 generates certain data to be sent to the backplane controller 120. In certain embodiments, the data contains commands to be used for controlling the backplane controller 120, such as a control command, a control parameter, a management instruction, a response to a request from the backplane controller 120, or any other data. It should be noted that the data is not in the format of a backplane drive management message. To generate the backplane drive management message, at procedure 520, the OS 140 sends the data to the drive management application 160. At procedure 525, upon receiving the data, the drive management application 160 generates the corresponding backplane drive management message from the data. At procedure 530, the drive management application 160 sends the backplane drive management message back to the OS 140.

In certain embodiments, during the configuration of the backplane controller 120 as a USB HID device, the OS 140 of the host computer 110 determines, based on the format codes 262 of the report descriptor 260, that data transfer between the backplane controller 120 and the host computer 110 should be a report in the predefined format. To send the backplane drive management message to the backplane controller 120, at procedure 540, the OS 140 sends the backplane drive management messages to the USB HID host driver 150, and instructs the USB HID host driver 150 to generate a report in the predefined format.

At procedure 545, the USB HID host driver 150 embeds the backplane drive management messages in the report based on the predefined format, and generates USB data packets of the report. In certain embodiments, the report includes one USB data packet. In certain embodiments, the USB data packet includes the packet header 320, the backplane drive management message 310, and the packet footer 330 as shown in FIG. 3. At procedure 550, the USB HID host driver 150 sends the USB data packets back to the OS 140.

At procedure 555, the OS 140 sends the USB data packets to the backplane controller 120 through the USB interface bus 130. In certain embodiments, the maximum packet size of endpoint zero of the backplane controller 120, which is defined in the bMaxPacketSize0 field of the device descriptor 210, can be 64 bytes.

At the backplane controller 120, when the firmware 126 receives the USB data packets from the host computer 110, at procedure 560, the firmware 126 sends the USB data packets to the USB HID device driver 180 for converting the USB data packets back to the report and retrieving the backplane drive management message embedded in the report. At procedure 565, the USB HID device driver 180 combines the USB data packets to generate the report, and retrieves the data embedded in the report according to the predefined format. Since the data embedded in the report is the backplane drive management message, the retrieved data will be the backplane drive management message generated at the host computer 110. At procedure 570, the USB HID device driver 180 sends the retrieved backplane drive management message to the firmware 126.

At procedure 575, the firmware 126 sends the backplane drive management message to the drive management module 190. At procedure 580, the drive management module 190 processes with the backplane drive management message to perform actions indicated by the backplane drive management message.

Figure 6:
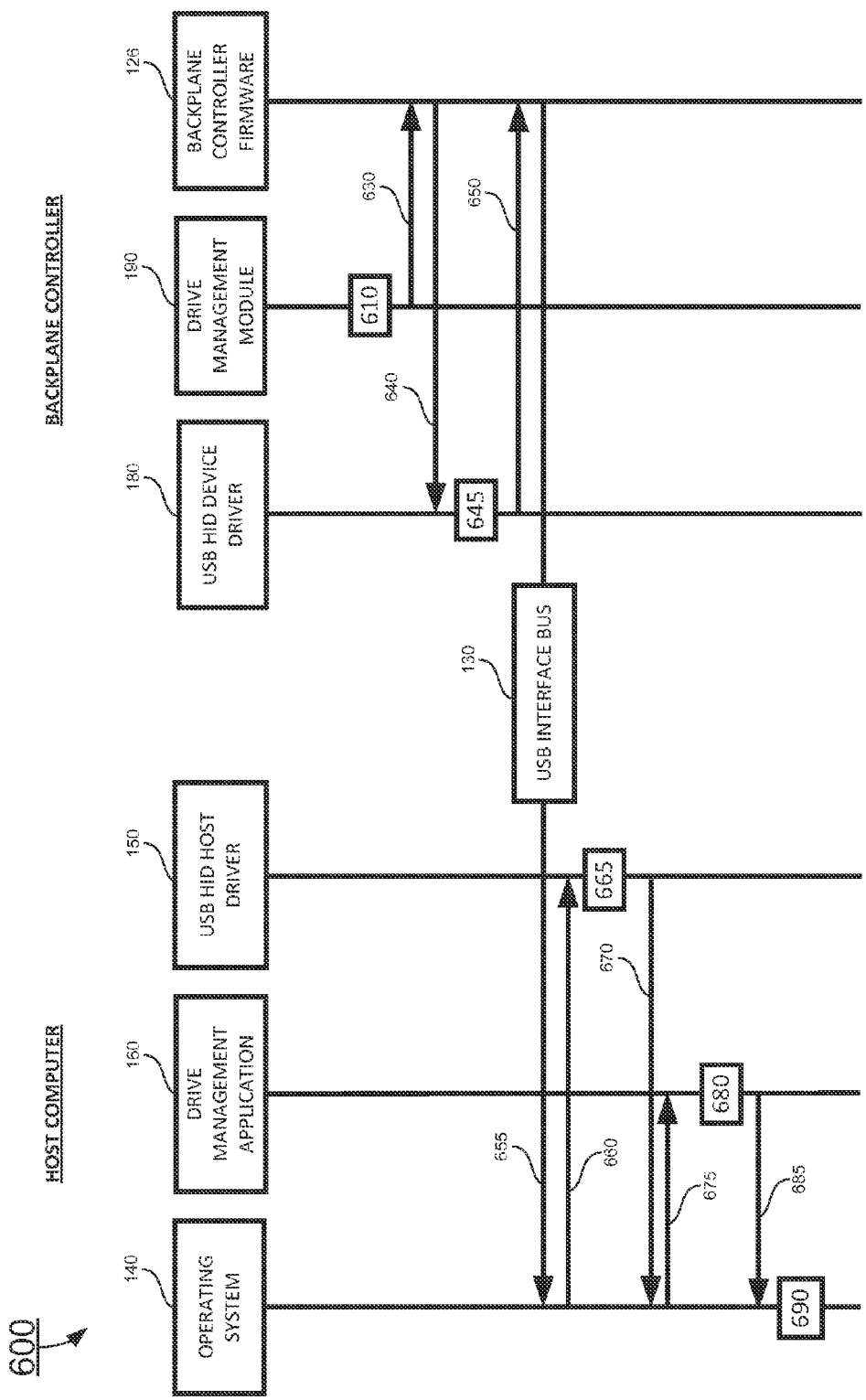
FIG. 6 schematically depicts data transfer from the backplane controller to the host computer according to certain embodiments of the present disclosure.

FIG. 6 shows data transfer from the backplane controller 120 to the host computer 110 according to certain embodiments of the present disclosure. Reports are transferred from the backplane controller 120 to the host computer 110 in a predefined format according to the format codes 262. The backplane controller 120 is a source device that initiates the data transfer process, and the host computer 110 is a target device that receives the data being transferred. USB 3.0 allows for device-initiated communications towards the host. Thus, the data transfer process from the backplane controller 120 to the host computer 110 can be initiated by the backplane controller 120 and the process is similar to the data transfer process from the host computer 110 to the backplane controller 120 as shown in FIG. 5.

At procedure 610, when the drive management module 190 monitors the storage drives 1000-1 through 1000-8 and detects certain activities, the drive management module 190 generates the corresponding backplane drive management messages to the activities. At procedure 630, the drive management module 190 sends the backplane drive management message to the firmware 126.

In certain embodiments, data transfer between the backplane controller 120 and the host computer 110 is a report in the predefined format. To send the backplane drive management message to the host computer 110, at procedure 640, the firmware 126 sends the backplane drive management messages to the USB HID device driver 180, and instructs the USB HID device driver 180 to generate a report in the predefined format.

At procedure 645, the USB HID device driver 180 embeds the backplane drive management message in the report based on the predefined format, and generates USB data packets of the report. In certain embodiments, the report includes one USB data packet. In certain embodiments, the USB data packet includes the packet header 320, the drive management message 310, and the packet footer 330 as shown in FIG. 3. At procedure 650, the USB HID device driver 180 sends the USB data packets back to the firmware 126. At procedure 655, the firmware 126 sends the USB data packets to the host computer 110 through the USB interface bus 130.

At the host computer 110, when the OS 140 receives the USB data packets from the backplane controller 120, at procedure 660, the firmware 126 sends the USB data packets to the USB HID host driver 150 for converting the USB data packets back to the report and retrieving the backplane drive management message embedded in the report. At procedure 665, the USB HID host driver 150 combines the USB data packets to generate the report, and retrieves the data embedded in the report according to the predefined format. Since the data embedded in the report is the backplane drive management message, the retrieved data will be the backplane drive management message generated at the backplane controller 120. At procedure 670, the USB HID host driver 150 sends the retrieved backplane drive management message to the OS 140.

At procedure 675, the OS 140 sends the backplane drive management message to the drive management application 160. At procedure 680, the drive management application 160 converts the backplane drive management message to data recognizable by the OS 140. At procedure 685, the drive management application 160 sends the data back to the OS 140. At procedure 690, the OS 140 may process the data.

The system and methods as described in the embodiments of the present disclosure relate to data transfer between the host computer 110 and the backplane controller 120 through the USB interface bus 130. The data being transferred includes backplane drive management messages embedded in the USB HID reports. This allows data transfer to be performed through the USB interface bus 130. Thus, a low cost backplane controller 120 without hardware/software support to more complicated system such as the HBA may utilize the methods as described in the embodiments to perform over USB data transfer through the USB interface bus 130.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
   a backplane controller, comprising a processor, a non-volatile memory and a universal serial bus (USB) interface, wherein the non-volatile memory stores firmware, a plurality of USB descriptors, and a USB human interface device (HID) device driver, wherein the firmware, when executed at the processor, is configured to
   when the backplane controller is connected to a host computer via the USB interface, send the plurality of USB descriptors to the host computer through the USB interface such that the host computer recognizes the backplane controller as a specific HID device based on the plurality of USB descriptors;
   generate a first backplane drive management message;
   in response to generating the first backplane drive management message, instruct the USB HID device driver to generate a first USB HID report in a predefined format based on the USB descriptors, wherein the predefined format comprises a USB header, report data, and a USB footer, and the report data of the first USB HID report is the first backplane drive management message;
   send the first USB HID report generated by the USB HID device driver to the host computer through the USB interface;
   receive a second USB HID report in the predefined format from the host computer through the USB interface;
   instruct the USB HID device driver to retrieve the report data from the second USB HID report, wherein the retrieved report data is a second backplane drive management message; and
   process the second backplane drive management message;
   wherein the host computer is configured to
   generate the second backplane drive management message as the report data of the second USB HID report;
   generate the second USB HID report from the second backplane drive management message in the predefined format based on the plurality of USB descriptors; and
   send the second USB HID report to the backplane controller through the USB interface.

2. The system as claimed in claim 1, wherein the USB header comprises a synchronization field and a packet identifier field, and the USB footer comprises a cyclic redundancy checking (CRC) field and an end of packet (EOP) field.

3. The system as claimed in claim 1, wherein each of the first USB HID report and the second USB HID report comprises at least one USB data packet.

4. The system as claimed in claim 1, wherein the firmware is configured to send the plurality of USB descriptors to the host computer through the USB interface by
   receiving a request for one of the USB descriptors from the host computer through the USB interface; and
   sending, in response to the request, the requested USB descriptor to the host computer through the USB interface.

5. The system as claimed in claim 1, wherein the firmware is configured to receive the second USB HID report from the host computer through the USB interface by
   receiving at least one USB data packet of the second USB HID report from the host computer through the USB interface; and
   instructing the USB HID device driver to combine the at least one USB data packet to generate the second USB HID report.

6. The system as claimed in claim 1, wherein the firmware is configured to send the first USB HID report to the host computer through the USB interface by instructing the USB HID device driver to
   generate at least one USB data packet from the first USB HID report; and
   send the at least one USB data packet of the first USB HID report to the host computer through the USB interface.

7. The system as claimed in claim 1, wherein the host computer comprises at least:
   a host processor configured to control operation of the host computer; and
   a storage device configured to store a drive management application, an operating system (OS), and a USB HID host driver,
   wherein the drive management application, when executed at the host processor, is configured to
   receive and process the first backplane drive management message received from the OS;
   generate the second backplane drive management message as the report data of the second USB HID report; and
   send the second backplane drive management message to the OS;
   wherein the OS, when executed at the host processor, is configured to
   when the backplane controller is connected to the host computer via the USB interface, receive the plurality of USB descriptors from the backplane controller through the USB interface, and recognize the backplane controller as the specific HID device to receive the second USB HID report based on the plurality of USB descriptors;
receive the second backplane drive management message from the drive management application;
instruct the USB HID host driver to generate the second USB HID report from the second backplane drive management message in the predefined format based on the plurality of USB descriptors;
send the second USB HID report generated by the USB HID host driver to the backplane controller through the USB interface;
receive the first USB HID report from the backplane controller through the USB interface; and
instruct the USB HID host driver to retrieve the first backplane drive management message from the first USB HID report and send the retrieved first backplane drive management message to the drive management application.

8. The system as claimed in claim 7, wherein the OS is configured to receive the plurality of USB descriptors to the host computer through the USB interface by
sending a request for one of the USB descriptors to the backplane controller through the USB interface; and
receiving the requested USB descriptor from the BMC through the USB interface.

9. The system as claimed in claim 7, wherein the USB descriptors comprise a device descriptor, at least one configuration descriptor, at least one interface descriptor, at least one endpoint descriptor, at least one HID descriptor, and at least one report descriptor.

10. The system as claimed in claim 9, wherein the at least one interface descriptor comprises a USB HID class code identifying the backplane controller as the specific HID device, and wherein the at least one report descriptor comprises format codes identifying the predefined format.

11. The system as claimed in claim 10, wherein the OS is configured to recognize the backplane controller as the specific HID device by
identifying the backplane controller as the specific HID device based on the USB HID class code of the at least one interface descriptor; and
identifying the predefined format based on the format codes of the at least one report descriptor.

12. The system as claimed in claim 7, wherein the OS is configured to receive the first USB HID report from the backplane controller through the USB interface by
receiving at least one USB data packet of the first USB HID report from the backplane controller through the USB interface; and
instructing the USB HID host driver to combine the at least one USB data packet to generate the first USB HID report.

13. The system as claimed in claim 7, wherein the OS is configured to send the second USB HID report to the backplane controller through the USB interface by instructing the USB HID host driver to
generate at least one USB data packet from the second USB HID report; and
send the at least one USB data packet of the second USB HID report to the host computer through the USB interface.

14. A computer-implemented method of controlling a backplane controller with a host computer, comprising:

sending, from the backplane controller, a plurality of universal serial bus (USB) descriptors to the host computer through a USB interface such that the host computer recognizes the backplane controller as a specific human interface device (HID) device based on the plurality of USB descriptors, wherein the backplane controller is connected to the host computer via the USB interface;
generating, at the backplane controller, a first backplane drive management message;
in response to generating the first backplane drive management message, instructing, at the backplane controller, a USB HID device driver to generate a first USB HID report in a predefined format based on the USB descriptors, wherein the predefined format comprises a USB header, report data, and a USB footer, and the report data of the first USB HID report is the first backplane drive management message;
sending, from the backplane controller, the first USB HID report generated by the USB HID device driver to the host computer through the USB interface;
receiving, at the backplane controller, a second USB HID report in the predefined format from the host computer through the USB interface;
instructing, at the backplane controller, the USB HID device driver to retrieve the report data from the second USB HID report, wherein the retrieved report data is a second backplane drive management message; and
processing, at the backplane controller, the second backplane drive management message
wherein the host computer is configured to
generate the second backplane drive management message as the report data of the second USB HID report;
generate the second USB HID report from the second backplane drive management message in the predefined format based on the plurality of USB descriptors; and
send the second USB HID report to the backplane controller through the USB interface.

15. The computer-implemented method as claimed in claim 14, wherein each of the first USB HID report and the second USB HID report comprises at least one USB data packet.

16. The computer-implemented method as claimed in claim 14,
wherein the backplane controller is configured to send the plurality of USB descriptors to the host computer through the USB interface by
receiving a request for one of the USB descriptors from the host computer through the USB interface; and
sending, in response to the request, the requested USB descriptor to the host computer through the USB interface;
wherein the backplane controller is configured to receive the second USB HID report from the host computer through the USB interface by
receiving at least one USB data packet of the second USB HID report from the host computer through the USB interface; and
instructing the USB HID device driver to combine the at least one USB data packet to generate the second USB HID report;
wherein the backplane controller is configured to send the first USB HID report to the host computer through the USB interface by instructing the USB HID device driver to
generate at least one USB data packet from the first USB HID report; and send the at least one USB data packet of the first USB HID report to the host computer through the USB interface.

17. The computer-implemented method as claimed in claim 14, wherein the host computer comprises:
 a host processor configured to control operation of the host computer; and
 a storage device configured to store a drive management application, an operating system (OS), and a USB HID host driver,
 wherein the drive management application, when executed at the host processor, is configured to
  receive and process the first backplane drive management message received from the OS;
  generate the second backplane drive management message as the report data of the second USB HID report; and
  send the second backplane drive management message to the OS;
 wherein the OS, when executed at the host processor, is configured to
  when the backplane controller is connected to the host computer via the USB interface, receive the plurality of USB descriptors from the backplane controller through the USB interface, and recognize the backplane controller as the specific HID device to receive the second USB HID report based on the plurality of USB descriptors;
  receive the second backplane drive management message from the drive management application;
  instruct the USB HID host driver to generate the second USB HID report from the second backplane drive management message in the predefined format based on the plurality of USB descriptors;
  send the second USB HID report generated by the USB HID host driver to the backplane controller through the USB interface;
  receive the first USB HID report from the backplane controller through the USB interface; and
  instruct the USB HID host driver to retrieve the first backplane drive management message from the first USB HID report and send the retrieved first backplane drive management message to the drive management application.

18. The computer-implemented method as claimed in claim 17, wherein the USB descriptors comprise a device descriptor, at least one configuration descriptor, at least one interface descriptor, at least one endpoint descriptor, at least one HID descriptor, and at least one report descriptor,
 wherein the at least one interface descriptor comprises a USB HID class code identifying the backplane controller as the specific HID device, and wherein the at least one report descriptor comprises format codes identifying the predefined format.

19. The computer-implemented method as claimed in claim 18,
 wherein the OS is configured to receive the plurality of USB descriptors to the host computer through the USB interface by
  sending a request for one of the USB descriptors to the backplane controller through the USB interface; and
  receiving the requested USB descriptor from the BMC through the USB interface;
 wherein the OS is configured to recognize the backplane controller as the specific HID device by identifying the backplane controller as the specific HID device based on the USB HID class code of the at least one interface descriptor; and
identifying the predefined format based on the format codes of the at least one report descriptor;
 wherein the OS is configured to receive the first USB HID report from the backplane controller through the USB interface by
  receiving at least one USB data packet of the first USB HID report from the backplane controller through the USB interface; and
  instructing the USB HID host driver to combine the at least one USB data packet to generate the first USB HID report.

20. A non-transitory computer readable medium storing computer executable codes, wherein the codes, when executed at a processor, are configured to
 send, from a backplane controller, a plurality of universal serial bus (USB) descriptors to a host computer through a USB interface such that the host computer recognizes the backplane controller as a specific human interface device (HID) device based on the plurality of USB descriptors, wherein the backplane controller is connected to the host computer via the USB interface;
 generate, at the backplane controller, a first backplane drive management message;
 in response to generating the first backplane drive management message instruct, at the backplane controller, a USB HID device driver to generate a first USB HID report in a predefined format based on the USB descriptors, wherein the predefined format comprises a USB header, report data, and a USB footer, and the report data of the first USB HID report is the first backplane drive management message;
 send, from the backplane controller, the first USB HID report generated by the USB HID device driver to the host computer through the USB interface;
 receive, at the backplane controller, a second USB HID report in the predefined format from the host computer through the USB interface;
 instruct, at the backplane controller, the USB HID device driver to retrieve the report data from the second USB HID report, wherein the retrieved report data is a second backplane drive management message; and
 process, at the backplane controller, the second backplane drive management message
 wherein the host computer is configured to
  generate the second backplane drive management message as the report data of the second USB HID report;
  generate the second USB HID report from the second backplane drive management message in the predefined format based on the plurality of USB descriptors; and
  send the second USB HID report to the backplane controller through the USB interface.

21. The non-transitory computer readable medium as claimed in claim 20, wherein each of the first USB HID report and the second USB HID report comprises at least one USB data packet.

22. The non-transitory computer readable medium as claimed in claim 20,
 wherein the codes are configured to send, from the backplane controller, the plurality of USB descriptors to the host computer through the USB interface by
  receiving a request for one of the USB descriptors from the host computer through the USB interface; and sending, in response to the request, the requested USB descriptor to the host computer through the USB interface;
wherein the codes are configured to receive, at the backplane controller, the second USB HID report from the host computer through the USB interface by
receiving at least one USB data packet of the second USB HID report from the host computer through the USB interface; and
instructing the USB HID device driver to combine the at least one USB data packet to generate the second USB HID report;
wherein the codes are configured to send, from the backplane controller, the first USB HID report to the host computer through the USB interface by instructing the USB HID device driver to
generate at least one USB data packet from the first USB HID report; and
send the at least one USB data packet of the first USB HID report to the host computer through the USB interface.

23. The non-transitory computer readable medium as claimed in claim 20, wherein the host computer comprises:
a host processor configured to control operation of the host computer; and
a storage device configured to store a drive management application, an operating system (OS), and a USB HID host driver,
wherein the drive management application, when executed at the host processor, is configured to
receive and process the first backplane drive management message received from the OS;
generate the second backplane drive management message as the report data of the second USB HID report; and
send the second backplane drive management message to the OS;
wherein the OS, when executed at the host processor, is configured to
when the backplane controller is connected to the host computer via the USB interface, receive the plurality of USB descriptors from the backplane controller through the USB interface, and recognize the backplane controller as the specific HID device to receive the second USB HID report based on the plurality of USB descriptors;
receive the second backplane drive management message from the drive management application;
instruct the USB HID host driver to generate the second USB HID report from the second backplane drive management message in the predefined format based on the plurality of USB descriptors;
send the second USB HID report generated by the USB HID host driver to the backplane controller through the USB interface;
receive the first USB HID report from the backplane controller through the USB interface; and
instruct the USB HID host driver to retrieve the first backplane drive management message from the first USB HID report and send the retrieved first backplane drive management message to the drive management application.

24. The non-transitory computer readable medium as claimed in claim 23, wherein the USB descriptors comprise a device descriptor, at least one configuration descriptor, at least one interface descriptor, at least one endpoint descriptor, at least one HID descriptor, and at least one report descriptor,
wherein the at least one interface descriptor comprises a USB HID class code identifying the backplane controller as the specific HID device, and wherein the at least one report descriptor comprises format codes identifying the predefined format.

25. The non-transitory computer readable medium as claimed in claim 24,
wherein the OS is configured to receive the plurality of USB descriptors to the host computer through the USB interface by
sending a request for one of the USB descriptors to the backplane controller through the USB interface; and
receiving the requested USB descriptor from the BMC through the USB interface;
wherein the OS is configured to recognize the backplane controller as the specific HID device by
identifying the backplane controller as the specific HID device based on the USB HID class code of the at least one interface descriptor; and
identifying the predefined format based on the format codes of the at least one report descriptor;
wherein the OS is configured to receive the first USB HID report from the backplane controller through the USB interface by
receiving at least one USB data packet of the first USB HID report from the backplane controller through the USB interface; and
instructing the USB HID host driver to combine the at least one USB data packet to generate the first USB HID report.

* * * * *